United States Patent [19]
Berte

[11] Patent Number: 5,656,706
[45] Date of Patent: Aug. 12, 1997

[54] ALKYL AND/OR ALKYLPHENYL POLY (OXYALKYLENE)SORBATE COPOLYMERS

[75] Inventor: Ferruccio Berte, Bergamo, Italy

[73] Assignee: 3V Inc., Weehawken, N.J.

[21] Appl. No.: 357,254

[22] Filed: Dec. 13, 1994

[30] Foreign Application Priority Data

Dec. 14, 1993 [IT] Italy ................ MI93A02614

[51] Int. Cl.$^6$ .................. C08F 220/26; C08F 220/04
[52] U.S. Cl. ................. 526/318.2; 526/318.25; 526/318.3; 526/318.41
[58] Field of Search ............... 526/318.41, 318.5, 526/318.3, 318.2, 318.25

[56] References Cited

U.S. PATENT DOCUMENTS

| 4,138,381 | 2/1979 | Chang | 526/318.41 |
| 4,267,103 | 5/1981 | Cohen | 526/318.41 |

*Primary Examiner*—Christopher Henderson
*Attorney, Agent, or Firm*—Griffin, Butler, Whisenhunt & Kurtossy

[57] ABSTRACT

Alkyl and/or alkylphenyl poly(oxyalkylene)sorbate copolymers are described and the salts thereof useful as thickening agents for aqueous systems.

10 Claims, No Drawings

ALKYL AND/OR ALKYLPHENYL POLY (OXYALKYLENE)SORBATE COPOLYMERS

The present invention relates to thickening agents and the use thereof in cosmetics and textiles. In particular, the present invention relates to alkyl and/or alkylphenyl poly (oxyalkylene)sorbate copolymers and the salts thereof.

BACKGROUND OF THE INVENTION

The major part of synthetic thickening agents consist of polymers and copolymers capable of acting as thickening agents following a partial or total neutralization.

In these cases, the low solubility or the insolubility in water of the non-neutralized polymer are made use of, thus allowing to obtain solutions or dispersions of the polymer in relatively high concentrations and of sufficiently low viscosities. This permits the use and the dosage of the thickening agent until the time of the neutralization thereof.

Polymer systems behaving like this have been known for a long time and they are in various physical forms which are more or less easy to use.

Thickening agents in aqueous solutions are known, e. g. some non cross-linked poly(meth)acrylic acids which, however, are rather difficult to use due to the high viscosity thereof, and moreover are not very effective.

Powdered thickening agents are also known, for example, cross-linked poly(meth)acrylic acids described in U.S. Pat. No. 2,798,053.

These products are very effective, but they are used more and more seldom as they cannot meet the current technological requirements since, to use them it is necessary to prepare an aqueous dispersion of the acidic form to use in the thickening process. The step of dispersion of the acidic form is very laborious and lengthy, moreover the obtained thickening agents are not resistant to salts.

Effective and easy to use polymer thickening agents are the copolymers in aqueous emulsion or polymer latexes, as those described in the UK Patent 870,994. They are copolymers of methacrylic acid with alkyl ($C_1$–$C_4$) acrylates, optionally cross-linked, obtained with emulsion polymerization techniques. According to these methods, poorly viscous latexes can be obtained, the active content of which ranges from 25 to 50% by weight.

Nevertheless, the salt resistance of these products is still insufficient.

Polymer systems, preferably in the form of latex, which are a further advance in terms of effectiveness and salt resistance while being easy to handle are those described in EP-A- 0,013,836 and European Patents 0,0110806 and 0,109,820. These publications claim copolymers obtained from monomeric mixtures similar to those described in the already cited UK Patent 870,994 in which, however, novel comonomers are present having a particular structure, such as (meth)acrylates or itaconates of non-ionic surfactants, such as ethoxylated fatty alcohols or ethoxylated alkylphenols.

These thickening agents are widely used in the textile, detergent and cosmetic fields.

Particularly important is the use of the latter thickening agents in latex form as additives to adjust, increasing it, the final viscosity of pastes for pigment printing of textiles.

A technological problem in printing textiles, in particular mixed synthetic fiber/cotton textiles, such as polyester/cotton, arises from the colour rendering of the paste and the dye fastness and contour sharpness of the printed design ("bleeding" effect).

SUMMARY OF THE INVENTION

Surprisingly it has been found that, using the copolymers according to the present invention in these systems, not only an increase in viscosity takes place, but also the yield of the printing process improves also compared with the copolymers according to the above cited literature. Particularly, the copolymers of the present invention are characterized by a better colour rendering index and the excellent contour sharpness in the pigment printing on cotton and mixed polyester/cotton.

An object of the present invention are alkyl and/or alkylphenyl poly(oxyalkylene)sorbate copolymers and the salts thereof with alkali metals, ammonia or amines obtained by copolymerization of:

(1) at least 10% by weight of one or more monomers selected from: methacrylic acid, acrylic acid, itaconic acid, maleic acid, fumaric acid, crotonic acid, citraconic acid and sorbic acid;

(2) from 0.5 to 30% by weight of at least one monomer of formula:

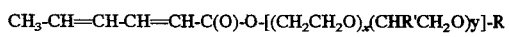

$$CH_3\text{-}CH=CH\text{-}CH=CH\text{-}C(O)\text{-}O\text{-}[(CH_2CH_2O)_x(CHR'CH_2O)_y]\text{-}R$$

wherein: x and y can be the same or different and can have values from 0 to 60 and x+y can range from 1 to 60

R' is $C_1$–$C_2$ alkyl

R is $C_6$–$C_{30}$ alkyl or $C_6$–$C_{30}$ alkylcycloalkyl or $C_6$–$C_{30}$ aralkyl and the expression $(CH_2CH_2O)_x(CHR'CH_2O)_y$ means that the $(CH_2CH_2O)_x$ and $(CHR'CH_2O)_y$ groups can be present in any order, from random to block and, optionally, also reversed.

DESCRIPTION OF PREFERRED EMBODIMENTS

Preferably, the copolymers of the present invention contain a further component (3) consisting of vinyl compounds or mixtures thereof selected from esters and amides of the acrylic, methacrylic and itaconic acids, acrylonitrile, methacrylonitrile, styrene, α-methylstyrene, vinyltoluene, vinyl and vinylidene halides, butadiene and isopropene, vinyl ethers and vinyl esters.

If desired, the copolymers of the present invention can have various cross-linking degrees. In this case, the copolymerization also comprises from 0 to 2% by weight of one or more polyunsaturated monomers, such as ethylene glycol dimethacrylate, divinylbenzene, allyl methacrylate and pentaerythritol polyallyl ethers.

Preferably the component (1) is methacrylic acid and/or acrylic acid; the component (3) is an alkyl (meth)acrylate, for example, ethyl acrylate.

Another object of the present invention is a process for the preparation of the above copolymers, by means of radical polymerization. Preferably, the polymerization is carried out in aqueous emulsion, so as to obtain polymeric latexes, with a polymeric solid content up to 50% on the total weight.

Sodium lauryl sulfate and sulfates of ethoxylated long chain alcohols are used as emulsifying agents, in amounts ranging from 0.2 to 6% by weight related to the monomers.

Among the radical polymerization initiators, ammonium or alkali metal persulfates are used, in amounts of 0.01–1.0% by weight related to the monomers.

Temperatures can range from 40° to 100° C.

Moreover, it is possible to use chain-transfer agents as molecular weight modifiers, such as mercaptoethanol and alkylmercaptanes, or also polyunsaturated monomers as cross-linking or branching agents, such as divinylbenzene and ethylene glycol dimethylacrylate.

The molecular weight modifiers and the cross-linkers can optionally be used to modify the thickening properties of the copolymers according to the present invention. In particular, the molecular weight modifiers serve to decrease the thickening action, but they can lead to products having a rheology more suitable to some uses, on the contrary cross-linkers can give polymers with a higher thickening action.

In a preferred embodiment, the invention provides a polymeric latex obtained by polymerization in aqueous emulsion of a monomeric system consisting of:

(1) from 20 to 50% by weight of methacrylic and/or acrylic acid,
(2) from 1 to 20% by weight of ester of sorbic acid with a $C_{10}$–$C_{22}$ alkyl poly(oxyethylene)ethanol in which the number of oxyethylene units is at least 10,
(3) from 40 to 60% by weight of ethyl acrylate,
(4) from 0 to 1% by weight of one or more polyunsaturated monomers.

Though the copolymers of the present invention are easier to use when in the form of latex, for particular purposes, it would be preferable to use them in other physical forms, for example as powders.

In these cases, a satisfactory product can be obtained drying the polymeric latex in a spray-dryer.

Another object of the present invention is the use of the copolymers described herein as thickening agents.

Generally speaking, said copolymers are useful in thickening and suspending gelatin-like mucilaginous or colloidal aqueous systems, in particular cosmetic or personal care compositions, such as shampoos, tooth pastes, creams, ointments.

In a second preferred embodiment, the copolymers of the invention, provided in various forms, latexes or powders, are used to thicken pastes for pigment printing.

The present invention also relates to a process for thickening the above aqueous systems.

Said process is carried out preferably adding the copolymers according to the present invention to the system to thicken and thickening the mixture by means of neutralization with bases, for example alkali metal hydroxides, ammonium hydroxide, ammonia and amines.

In the case of pastes for pigment printing already neutralized and ready-to-use, the adjustment of the viscosity is obtained by simple addition and admixing of the latex of the copolymers according to the present invention in sufficiently low amounts not to appreciably change the final pH.

In any case, it is possible to thicken the same aqueous systems adding the copolymers in an already partially or completely neutralized form.

It has surprisingly been found that the copolymers of the present invention interact in aqueous solutions with a number of water-soluble surfactants, preferably the anionic and/or non-ionic ones. The effect on the viscosity of the system is, in these cases, synergistic, leading to viscosity values much higher than those expected, and it can be made use of to thicken aqueous systems based on surfactants, for example shampoos.

In the following, examples illustrative of the invention are reported.

Parts and percent values are by weight and temperatures are in degrees centigrade.

EXAMPLE A

Preparation of the monomer (component 2).

A mixture of 150 g of cetyl stearyl ethoxylated alcohol with 25 moles of ethylene oxide, 0.50 g of hydroquinone monomethyl ether and 100 g of toluene is heated to 60°–70° C. until a homogeneous solution. After that, under an air stream, 12.40 g of sorbic acid and 2.0 g of concentrated sulfuric acid are added. The mixture is refluxed removing the reaction water. When no more water develops, air bubbling is stopped and toluene is distilled off at atmospheric pressure, then under vacuum to reach 100° C. and 30 mmHg of vacuum residue.

158 g of a brown liquid product are obtained, which solidifies below 40° C.

EXAMPLE B

Preparation of the copolymer.

An aqueous emulsion of the monomers is prepared, consisting of: 128.5 g of demineralized water, 6.6 g of 28% aqueous sodium lauryl sulfate, 126.8 g of ethyl acrylate, 92.7 g of methacrylic acid, 24.3 g of monomer of the example A. This emulsion is deoxygenated by nitrogen bubbling.

A solution of 336.6 g of demineralized water and 6.6 g of 28% aqueous sodium lauryl sulfate, deoxygenated and heated to 85° C., is quickly added, under a nitrogen stream, with 18.9 g of emulsion of the monomers prepared above and 37.7 g of a 0.70% ammonium persulfate aqueous solution. The mixture is reacted for 15 min., then the remaining 360.0 g of monomeric emulsion and 18.3 g of 0.70% ammonium persulfate aqueous solution are fed continuously for a time of about 90 minutes. At the end of feeding, after about 30 minutes, a further 28.5 g of 0.35% ammonium persulfate aqueous solution are added and the polymerization is completed in 60 minutes at 85° C. Finally, the resulting latex is cooled and discharged.

In Table I, the Brookfield (RVT-20 rpm) viscosity values of 0.50% by weight polymer aqueous solutions neutralized with sodium hydroxide are reported. The values after addition of 0.20% by weight of sodium lauryl sulfate (SLS) are also given. For comparison, the data relating to two latexes obtained following the procedures of other patents cited above are reported.

TABLE I

| Polymeric latex | Brookfield RVT viscosity 25° C. - 20 rpm - mPa.s | |
| --- | --- | --- |
| | — | +0.20% SLS |
| A | 800 | 9,500 |
| B | 1,800 | 8,000 |
| C | 860 | 7,000 |

Wherein:
A = Polymeric latex obtained according to the present example
B = Comparison polymeric latex obtained
C = Comparison polymeric latex obtained according to example 4 - Tab. IV - Polymer BL of EP-A- 0,013,836.

EXAMPLE C

A paste for pigment printing is prepared mixing by means of a Silverson stirrer the following products:

| | |
|---:|:---|
| 3.80 g | DEFOPRINT |
| 3.40 g | 25% AMMONIA |
| 29.20 g | NOVAPRINT NS |
| 233.00 g | LEGOPRINT EPC |
| 19.40 g | FIXOL ST |
| 1652.80 g | HARD WATER (hardness 25° F.) |
| 58.40 g | BLUE RT PIGMENT |

The viscosity of this paste is of 17000 mPa.s (RVT-25° C.-20 rpm).

1.35 g of latex are added to 500 g of paste. After homogenization with a Silverson stirrer, the same final viscosity of 23000 mPa.s (RV2-20 rpm) is obtained, respectively with each of the three latexes A, B, C described.

Printing tests on cotton textile and mixed 65:35 polyester/cotton textile are then carried out.

The printing process is effected on a mini laboratory machine type MDF R376 by the firm J. Zimmer.

The prints are subsequently fixed by heat treatment at 160° C. for 3 min.

In Table II the obtained results are reported, the evaluation being visual.

TABLE II

| | COLOUR YIELD | | CONTOUR SHARPNESS | |
|---|---|---|---|---|
| LATEX | COTTON | PES/COT 65:35 | COTTON | PES/COT 65:35 |
| — | 0 | 0 | 2 | 0 |
| A | 2 | 2 | 2 | 2 |
| B | 1 | 1 | 2 | 1 |
| C | 1 | 1 | 2 | 1 | wherein
0 = Low
1 = Average
2 = High

I claim:

1. Copolymers obtained by copolymerization of:
   (1) at least 10% by weight of a carboxylic acid selected from: methacrylic acid, acrylic acid, itaconic acid, maleic acid, fumaric acid, crotonic acid, citraconic acid and sorbic acid and mixtures thereof,
   (2) from 0.5 to 30% by weight of at least one monomer of formula:

$$CH_3-CH=CH-CH=CH-C(O)-O-[(CH_2CH_2O)_x(CHR'CH_2O)_y]-R$$

wherein: x and y can be the same or different and can individually have values from 0 to 60 and x+y ranges from 1 to 60

R' is $C_1-C_2$ alkyl

R is selected from the group consisting of $C_5-C_{30}$ alkyl, $C_6-C_{30}$ alkylcycloalkyl, and $C_6-C_{30}$ aralkyl and the salts thereof with alkali metals, ammonia and amines.

2. Copolymers according to claim 1 copolymerized with a further component 3 selected from esters and amides of acrylic, methacrylic, itaconic acids, acrylonitrile, methacrylonitrile, -methylstyrene, vinyltoluenes, vinyl and vinylidene halides, butadiene and isoprene, vinyl esters and vinyl ethers or mixtures thereof.

3. Copolymers according to claim 1, cross-linked with at least one polyunsaturated monomer.

4. Copolymers according to claim 1, wherein the component (2) is present in an amount ranging from 1 to by weight.

5. Copolymers according to claim 1, wherein the component 1 is present in an amount ranging from 20 to 50% by weight.

6. Copolymers according to claim 1, wherein the component (1) is acrylic acid, methacrylic acid, itaconic acid or mixtures thereof.

7. Copolymers according to claim 1, wherein the component (2) is an ester of sorbic acid with an ethoxylated $C_{10}-C_{22}$ alcohol.

8. Copolymers according to claim 2, wherein the component (3) comprises one or more $C_1-C_4$ alkyl acrylates and/or methacrylates.

9. Polymeric latexes produced from copolymers of claims 1, 2 or 3.

10. Polymeric powders produced from copolymers of claims 1, 2 or 3.

* * * * *